United States Patent
Nakamura

(10) Patent No.: US 9,581,195 B2
(45) Date of Patent: Feb. 28, 2017

(54) LOW-VIBRATION FLOATING METAL BEARING

(71) Applicant: NAKAMURA INDUSTRIAL MFG. CO., LTD, Tochigi (JP)

(72) Inventor: Shotaro Nakamura, Tochigi (JP)

(73) Assignee: NAKAMURA INDUSTRIAL MFG. CO., LTD., Tochigi (JP)

( * ) Notice: Subject to any disclaimer, the term of this patent is extended or adjusted under 35 U.S.C. 154(b) by 499 days.

(21) Appl. No.: 14/236,177

(22) PCT Filed: Jul. 31, 2013

(86) PCT No.: PCT/JP2013/070764
§ 371 (c)(1),
(2) Date: Jan. 30, 2014

(87) PCT Pub. No.: WO2015/015599
PCT Pub. Date: Feb. 5, 2015

(65) Prior Publication Data
US 2016/0223014 A1 Aug. 4, 2016

(51) Int. Cl.
*F16C 32/06* (2006.01)
*F16C 33/10* (2006.01)
(Continued)

(52) U.S. Cl.
CPC ........ *F16C 32/0655* (2013.01); *F16C 17/028* (2013.01); *F16C 17/18* (2013.01);
(Continued)

(58) Field of Classification Search
CPC .... F16C 17/18; F16C 33/1045; F16C 33/106; F16C 33/1085; F16C 2360/24
(Continued)

(56) References Cited

U.S. PATENT DOCUMENTS 2,796,659 A    6/1957  Buske
3,560,064 A *  2/1971  Silver ................. F16C 32/0644
                                                   384/114
(Continued)

FOREIGN PATENT DOCUMENTS

DE          332357 C1      4/1985
DE   102009007696 A1 *   8/2010  ............. F01D 5/063
(Continued)

OTHER PUBLICATIONS

International Search Report and Written Opinion, dated Sep. 3, 2013, which issued during the prosecution of International Patent Application No. PCT/JP2013/070764, which corresponds to the present application.
(Continued)

*Primary Examiner* — Phillip A Johnson
(74) *Attorney, Agent, or Firm* — Troutman Sanders LLP

(57) ABSTRACT

A low-vibration floating metal bearing includes a slide bearing. The slide bearing includes oil supply holes formed at six isogonal positions in an isotropic manner with respect to an axial center, and a substantially circular bearing hole having a surface on which at least six regions with different fluid lubrication conditions are formed by inner machining so as to be continuously disposed at isogonal positions in an isotropic manner with isotropic distance with respect to an axial center. Each of the regions with different fluid lubrication conditions forms a narrow flow path that is substantially convex in cross section and extends in an axial center direction in an oil flow path by changing the amount of clearance between the surface of the substantially circular bearing hole and the surface of a substantially circular axis.

2 Claims, 9 Drawing Sheets

(51) Int. Cl.
    *F16C 17/18* (2006.01)
    *F16C 17/02* (2006.01)
    *F16C 33/14* (2006.01)

(52) U.S. Cl.
    CPC ...... *F16C 32/0651* (2013.01); *F16C 33/1045* (2013.01); *F16C 33/1075* (2013.01); *F16C 33/14* (2013.01); *F16C 2360/24* (2013.01)

(58) Field of Classification Search
    USPC .................................. 384/114, 286, 287, 322
    See application file for complete search history.

(56) References Cited

U.S. PATENT DOCUMENTS

| | | | | |
|---|---|---|---|---|
| 3,993,370 | A | * | 11/1976 | Woollenweber ...... F01D 25/166 384/287 |
| 4,427,309 | A | * | 1/1984 | Blake .................... F01D 25/166 384/286 |
| 4,834,559 | A | | 5/1989 | Kalvoda |
| 5,628,567 | A | | 5/1997 | Murabe et al. |
| 2014/0010647 | A1 | | 1/2014 | Nishida et al. |

FOREIGN PATENT DOCUMENTS

| | | |
|---|---|---|
| EP | 0732516 A1 | 9/1996 |
| GB | 742218 A | 12/1955 |
| JP | S61-201917 A | 9/1986 |
| JP | H01-193409 A | 8/1989 |
| JP | 2517541 Y2 | 9/1996 |
| JP | H11-336744 A | 12/1999 |
| JP | 2008-111502 A | 5/2008 |
| JP | 2008-190498 A | 8/2008 |
| JP | 2012-207584 A | 10/2012 |
| JP | 2013-079591 A | 5/2013 |

OTHER PUBLICATIONS

Extended European Search Report dated on Nov. 11, 2016 issued in corresponding European Patent Applicatio No. 13834367.8.

\* cited by examiner (a)

(b)

(a)

(b)

LOW-VIBRATION FLOATING METAL BEARING

CROSS-REFERENCE TO RELATED APPLICATION

The present application is a 371 of International Application No. PCT/JP2013/070764 filed on Jul. 31, 2013, the entire content of which being hereby incorporated herein by reference.

TECHNICAL FIELD

The present invention relates to techniques for bearings. More specifically, the present invention relates to a low-vibration floating metal bearing technique. In the present invention, the surface of a bearing hole in a slide bearing is subjected to inner surface machining to provide the surface with a plurality of regions having different fluid lubrication conditions, the regions arranged in an isogonal and isotropic manner with respect to the axial center of the hole. Hence, the present invention makes it possible to exert a high centering effect from a low rotational speed range to a high rotational speed range and suppress occurrence of noise by a vibration suppression effect resulting from the centering effect.

BACKGROUND ART

Bearings play a crucial role in the modern industrial world. Bearings are important factors to determine the performance and accuracy of products. In particular, bearings supporting the high-speed rotation of a product at high temperature or under high load conditions need to maintain a certain level of performance even under extreme conditions. Bearings can fall into broad categories: slide bearings and rolling bearings. Thus, the slide bearings or the rolling bearings can be selected as one more stable than the other for such as use condition, and purpose. In some products, the both types of bearings may be alternatively used at one and the same portion of one and the same product.

For example, both floating metal bearings and ball bearings are alternatively used as bearings for turbine shafts in exhaust gas turbine superchargers for use in internal combustion engines of automobiles. In comparison, the ball bearings have more advantages in performance related to such as friction. However, the ball bearing turbines basically need a larger amount of oil. Thus, if the amount of oil is not suppressed by providing an orifice to a banjo bolt of an oil line or other parts, several problems occur due to excessive oil. In addition, the rotation speed of the turbines may exceed 200,000 rpm. The turbines are directly subject to high-temperature exhaust gas (800 to 900° C.). Thus, the oil is more prone to deteriorate as compared to the case where the oil is exposed to natural intake air. In some cases, therefore, the floating metal bearings may be selected instead of the ball bearings requiring severe oil management. In addition, the floating metal bearings are lower in manufacturing cost and running cost.

Exhaust gas turbine turbochargers allow a significant output improvement with a small displacement. The exhaust gas turbine turbochargers are in particular compatible with diesel engines. Thus, just like hybrid cars and EVs, attention is now given to eco-cars with a combination of a smaller-displacement gasoline engine and a turbocharger, clean diesel cars with a combination of an emission-reduced diesel engine and a turbocharger, and the like.

Therefore, under social conditions related to environments or resources, it is strongly desired in the future to improve the floating metal bearings having few problems with such as cost and oil management in performance so as to have friction characteristics and durability on a par with the ball bearings. However, the slide bearings still have a major problem of being more prone to cause noise as compared to the ball bearings. The issue of eliminating noise and the like from an object sliding at a high speed cannot be solved immediately. To counter the foregoing problem, significant improvements have been made in the technical field of slide bearings by technical developments of floating and the like. However, these improvements still cannot be said to be sufficient.

Various techniques have been suggested to meet the social demand. For example, there is a publicly-known technique for the bearing structure of a turbocharger that rotatably supports a rotary shaft connecting a pair of wheels by a fluid bearing, the bearing structure suppressing the rotation speed of a floating metal. See, for example, Japanese Patent Application Publication No. JP-A 2008-190498 ("JP '498"). The technique allows the bearing structure to suppress occurrence of noise resulting from whirl vibration of the rotary shaft. Similarly, there is a publicly-known technique for a bearing structure that rotatably supports a rotation shaft by a pair of fluid bearings, the bearing structure suppressing occurrence of noise resulting from whirl vibration of the rotation shaft. See, for example, Japanese Patent Application Publication No. JP-A 2008-111502 ("JP '502").

The goals of the inventions disclosed in, for example, the JP '498 and the JP '502 are both to "suppress occurrence of noise," which is similar to the goal of the present invention to "reduce noise." However, at a fluid-lubricated bearing that generates a pressure (dynamic pressure) on a lubricating fluid film by relative sliding movement due to rotation and supports a load under the pressure, the dynamic pressure acts on the entire circumference of the floating metal bearing. Thus, the centering effect of metal due to the dynamic pressure is weaker than that in the present invention. This is because the cross section area of the flow passage in which the fluid flows is small, and thus no large flow velocity difference is generated even when the stopped shaft begins to rotate. In addition, the foregoing conventional techniques have complicate structures and still have cost-related problems. Specifically, oil is one of the structures for suppressing the rotation of a bush floating metal to suppress whirl vibration, and another one of the structures is an outer bush. These are separated from each other in an axial direction around which the floating metal in the rotary shaft is rotated.

As another conventional technique, there is a publicly-known technique for a bearing mechanism in a turbocharger. See, for example, Japanese Utility Model No. JP-U 2517541 ("JP '541). In the bearing mechanism, a turbine shaft is supported in a bearing housing via a radial bearing, a thrust bearing, and bushes. At the turbine rotor side, the shaft is supported by one radial bearing held in the bearing housing. At the compressor side, the first bush, the thrust bearing fixed to the bearing housing, and the second bush are sandwiched in this order between the shaft and the compressor rotor. The first bush has a cylinder portion extending between the outer peripheral surface of the shaft and the inner peripheral surface of the thrust bearing. Also in the bearing mechanism, a semicircular oil groove is formed in an inner peripheral surface facing the cylindrical portion of the thrust bearing. Lubricating oil is supplied to the semicircular oil groove from an oil hole in the bearing housing through an oil hole provided in the thrust bearing.

However, the foregoing turbocharger bearing structure includes a large number of components (such as the thrust bearing, the radial bearing, the plurality of bushes, and an air pressurization mechanism). In addition, the bearing housing accommodating these components may be difficult to be provided in terms of reduction in space and cost.

Further, the foregoing patent and utility model documents do not suggest or describe any configuration for eliminating noise.

Therefore, the foregoing conventional techniques have not solved the issue of meeting the social demand expected for floating metal bearings.

The inventor of the invention of the subject application has reviewed various machining conditions such as surface roughness or roundness. The inventor then has revealed that, even if high-accuracy roundness characteristics or surface roughness characteristics are improved, it is difficult to suppress occurrence of noise, that is, occurrence of vibrations resulting in the noise. In light of the foregoing background, the inventor has repeatedly carried out experiments with changes in roundness, under the assumption that the roundness of the inner surface of a shaft bearing hole can be polygonally altered to suppress occurrence of vibrations. As a result, the present inventors have completed the present invention.

SUMMARY

The present invention employs means having features as described below. Specifically, inner surface machining is applied to the surface of a bearing hole in a slide bearing. In the inner surface machining, a plurality of regions with different fluid lubrication conditions is continuously disposed in an isogonal and isotropic manner with respect to an axial center. Each of the regions with different fluid lubrication conditions refers to one region that moderately connects a narrow flow path and a wide flow path by changing the amount of clearance between the surface of a shaft and the inner surface of the bearing hole. Thus, it is possible to obtain a high centering effect and suppress occurrence of noise from a low rotational speed range to a high rotational speed range.

The present invention also employs means as described below. Specifically, the means is characterized by the low-vibration floating metal bearing in which the number of oil supply holes formed in an isogonal and isotropic manner with respect to an axial center is six.

Inner surface machining is applied to the low-vibration floating metal bearing according to the present invention. The machining continuously disposes in an isogonal and isotropic manner with respect to the axial center, a plurality of regions with different fluid lubrication conditions at isogonal positions in an isotropic manner with respect to the axial center. Each of the regions with different fluid lubrication conditions is one region that connects moderately a narrow flow path and a wide flow path by changing the amount of clearance between the surface of the shaft and the inner surface of the bearing hole. Thus, the present invention produces a high centering effect from a low rotational speed range to a high rotational speed range. The present invention also makes less prone to cause improper vibrations or self-excited vibrations. Therefore, the present invention provides an excellent advantage of suppressing occurrence of noise resulting from these vibrations.

The low-vibration floating metal bearing according to the present invention is a slide bearing that delivers excellent functional performance with friction characteristics or durability on a par with ball bearings. On the other hand, the low-vibration floating metal bearing does not need oil pressure control or management, or special components that would be required for ball bearings and the like.

Under the centering effect, when the rotation starts, a dynamic pressure acts so as to move constantly toward the axial center. The dynamic pressure has the effect of suppressing swings. As a result, as compared to normal floating bearings formed by conventional circular shapes, the low-vibration floating metal bearing decreases rotational resistance.

DETAILED DESCRIPTION

The largest feature of the present invention resides in applying surface treatment repeatedly to between a narrow flow path and a wide flow path by changing the amount of clearance between the surface of a shaft and an inner surface of a bearing hole 40.

Figure 1:
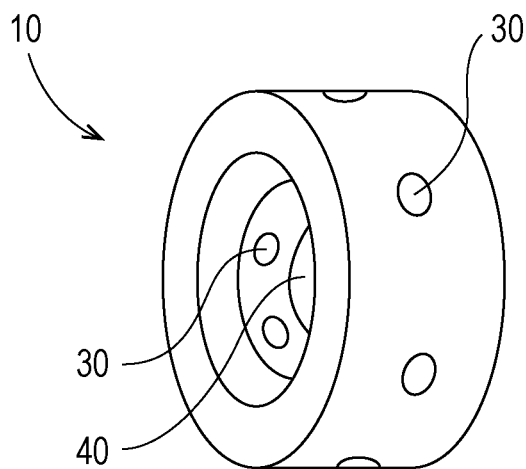
FIG. 1 is a schematic diagram illustrating a floating metal bearing according to the present invention.
Figure 1:
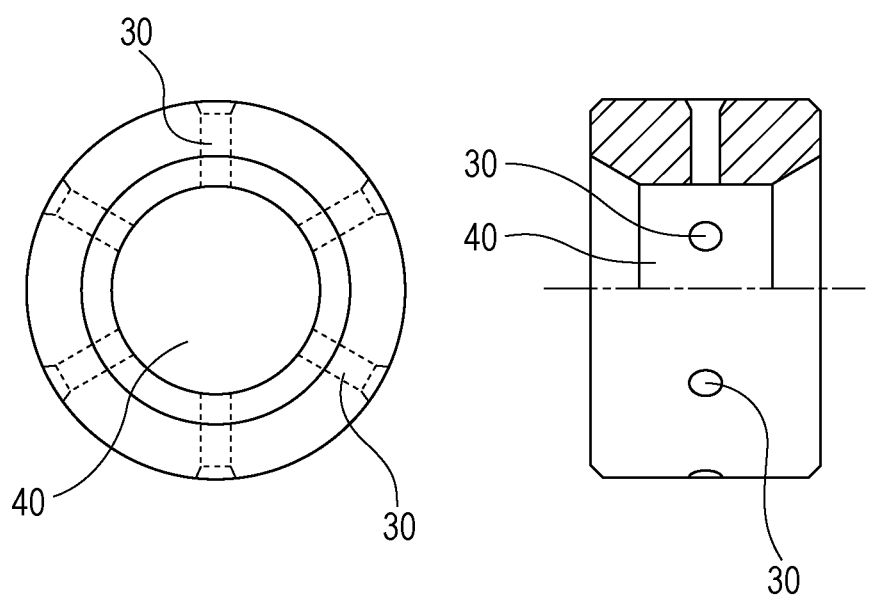

FIG. 1 is a diagram schematically illustrating a low-vibration floating metal 10 according to the present invention: FIG. 1(a) is a perspective view; and FIG. 1(b) is a plan view and a single cross-section view.

As illustrated in FIG. 1, the low-vibration floating metal 10 may have an outline similar to that of the normal floating metals. The low-vibration floating metal 10 has a plurality of oil supply holes 30 provided in an isogonal and isotropic manner in the center of the outer peripheral edge. Alternatively, the low-vibration floating metal 10 may have on a periphery thereof an oil supply groove (not illustrated) with the oil holes 30. FIG. 1 illustrates six oil supply holes 30, but the number of the oil supply holes 30 is not limited to six. There is no particular limitation on the number of the oil supply holes 30 as far as the advantage of the inner diameter surface shape of the bearing hole 40 as the essence of the present invention can be produced. In addition, the number of the oil supply holes 30 does not depend on the cross section area of the oil supply holes 30 or any other factor.

Figure 2:
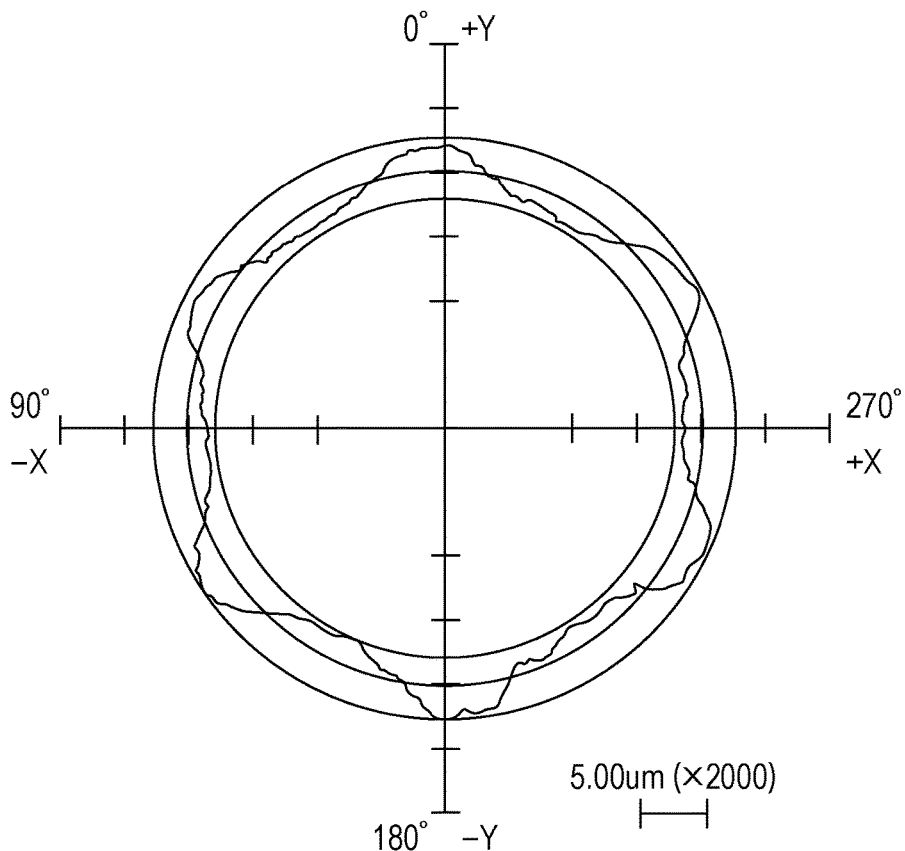
FIG. 2 is a diagram illustrating a roundness result (1) of an inner surface shape of a bearing hole according to the present invention.

FIGS. 2 to 6 illustrate the results of measurement of inner roundness of the bearing hole 40 according to the present invention. FIG. 2 illustrates the measurement result of roundness of the center of the outer peripheral edge. Specifically, FIG. 2 illustrates the measurement result of roundness at a position 4.13 mm inward from one end surface.

Figure 3:
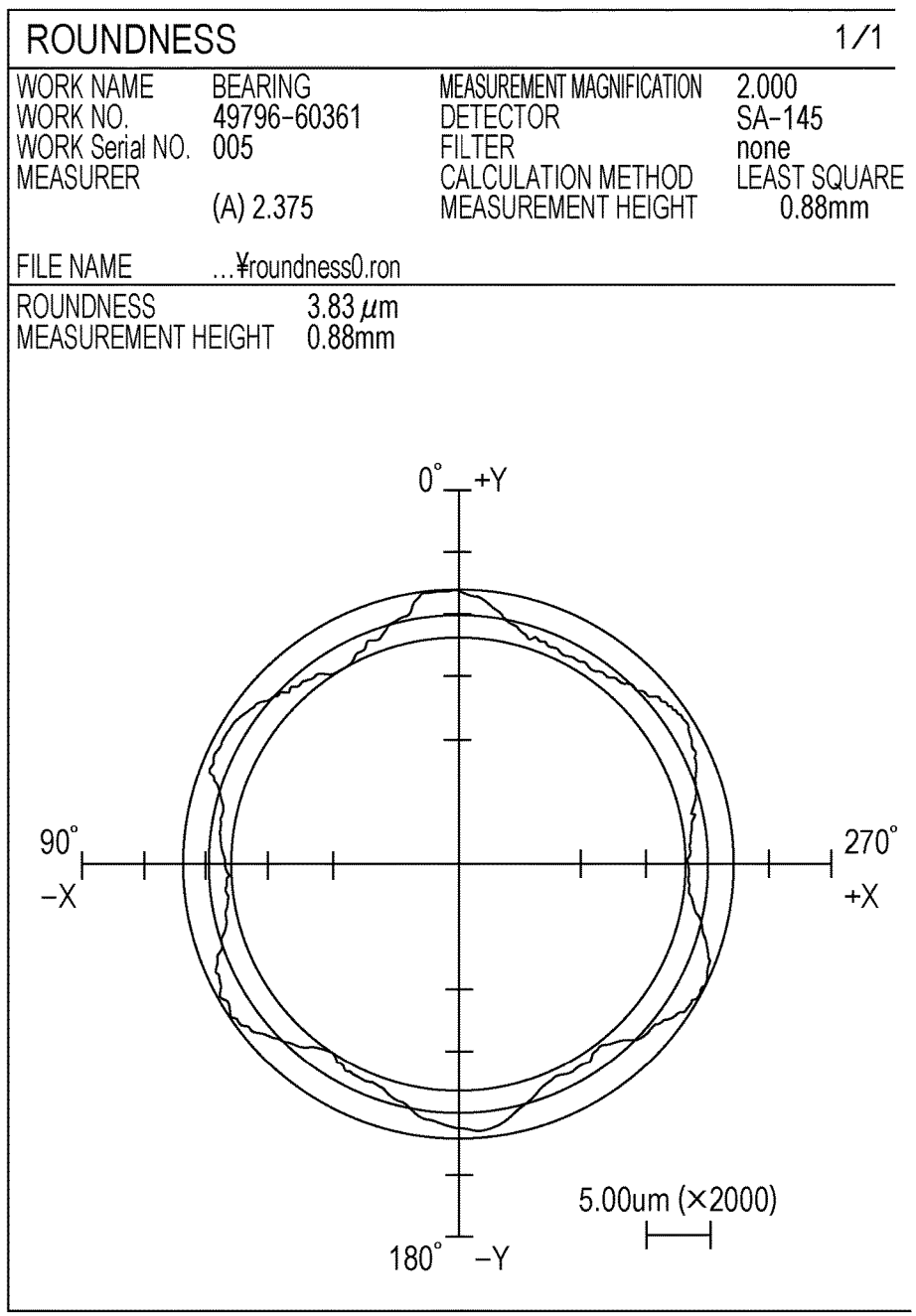
FIG. 3 is a diagram illustrating a roundness result (2) of an inner surface shape of the bearing hole according to the present invention.

FIG. 3 illustrates the measurement result of an end surface and its vicinity. Specifically, FIG. 3 illustrates the measurement result at a position 0.88 mm inward from one end surface. The roundness of the other end surface is almost the same as that illustrated in FIG. 3 and thus is omitted.

In all the measurements of FIGS. 2 to 6, the measurement magnification used is 2000 times.

Figure 6:
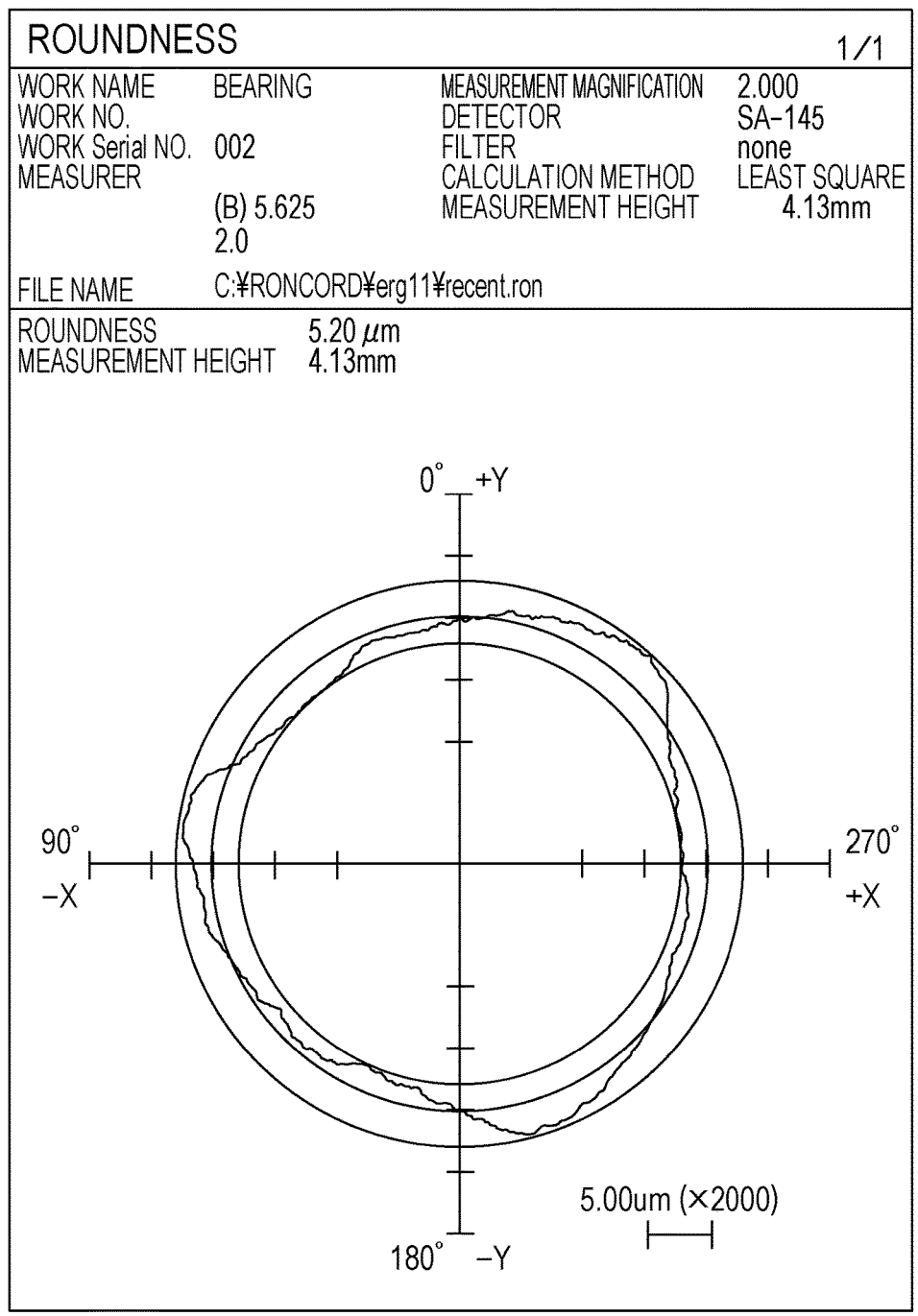
FIG. 6 is a diagram illustrating a roundness result (5) of an inner surface shape of the bearing hole according to the present invention.

Of line illustrated in FIGS. 2 and 6, the innermost circle represents the maximum height as defined in JIS B7451 and the outermost circle represents the maximum depth. The circle between the innermost and outermost circles represents the average value of roundness. The roundness from the maximum height to the maximum depth is 4.87 μm in FIG. 2 and 3.83 μm near the end surface illustrated in FIG. 3. The metal bearing used for obtaining the experimental data has six oil supply holes 30. However, the number of the oil supply holes is not limited to this as described above.

Figure 4:
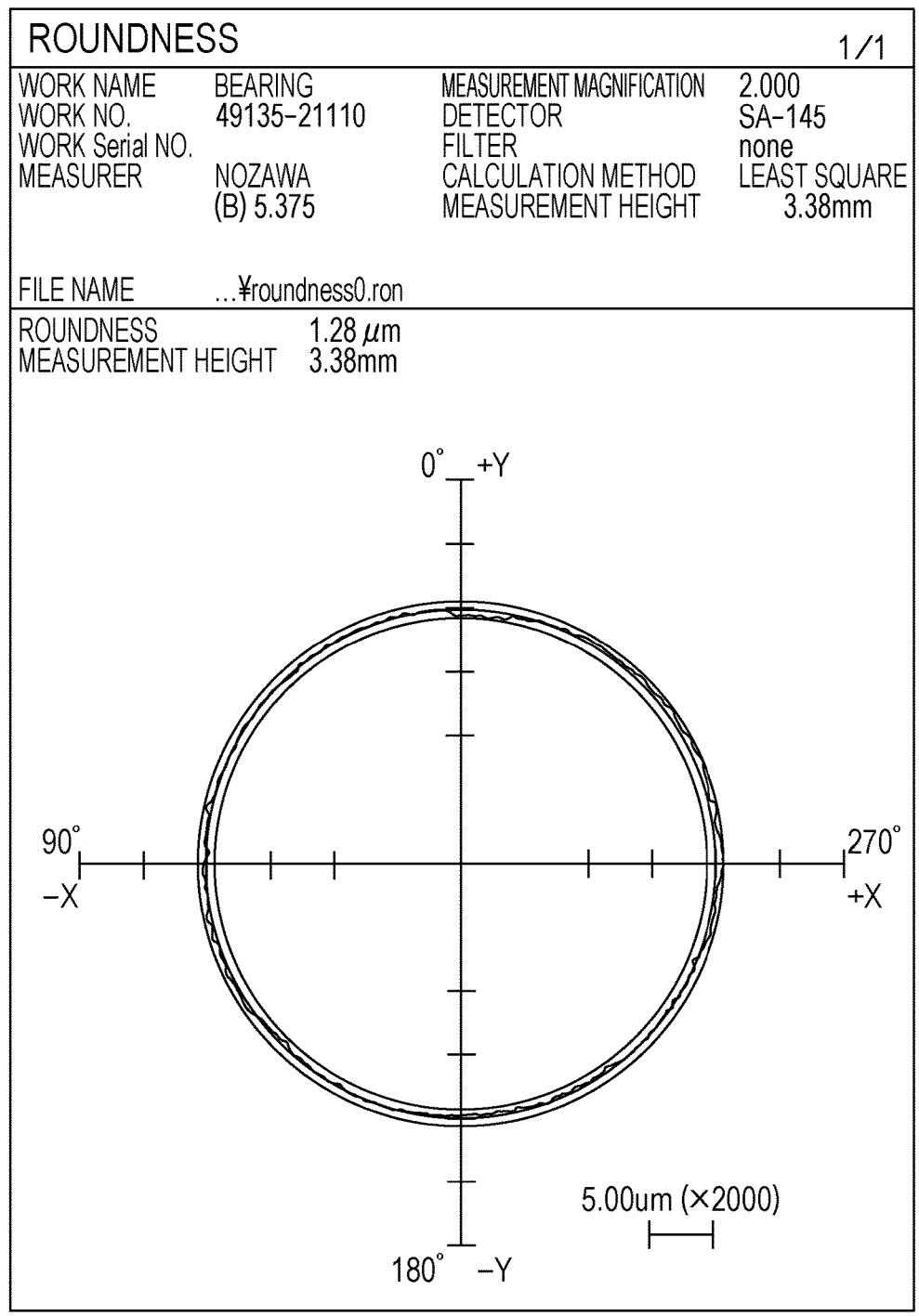
FIG. 4 is a diagram illustrating a roundness result (3) of an inner surface shape of the bearing hole according to the present invention.

FIG. 4 illustrates the result of pursuit of roundness, indicating a roundness of 1.28 μm. As compared to the other drawings, the roundness in FIG. 4 is apparently higher. However, it has been revealed by measurement with a vibration meter that there is no special tendency to attenuate vibrations.

Figure 5:
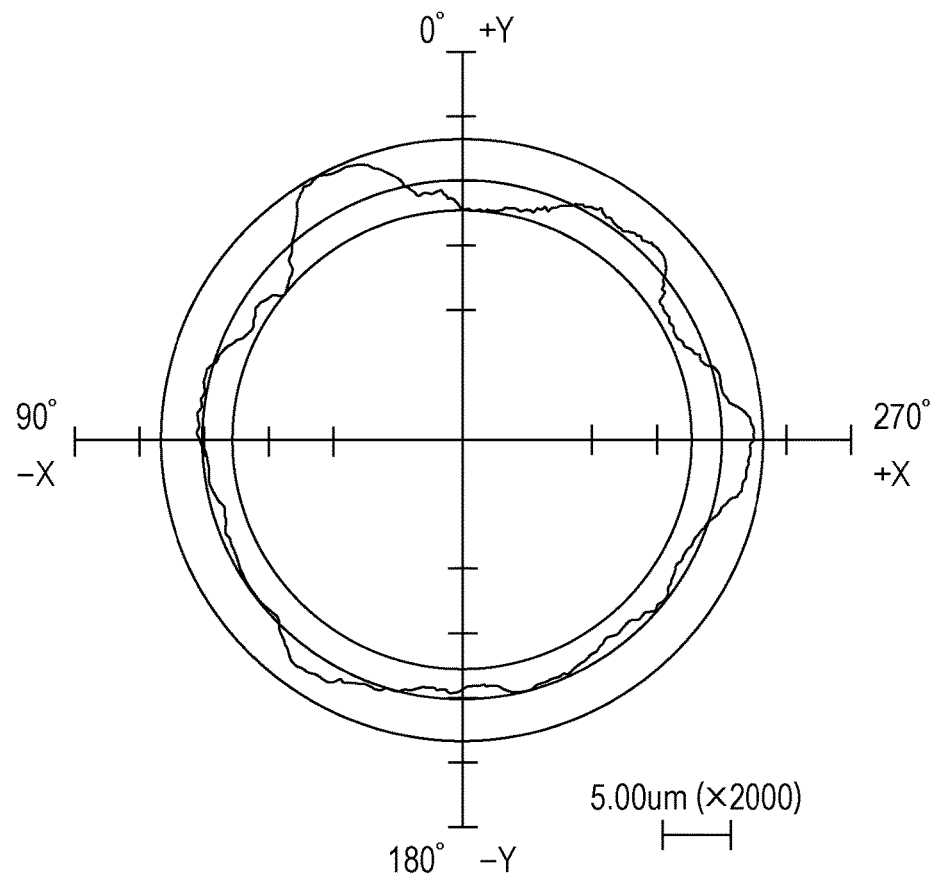
FIG. 5 is a diagram illustrating a roundness result (4) of an inner surface shape of the bearing hole according to the present invention.

FIG. 5 represents intentionally prepared data to know the state with a disordered roundness. The roundness illustrated in FIG. 5 is at a defective level not meeting criteria for quality assurance of general products. However, it was found that the roundness illustrated in FIG. 5 had less influence of a problem such as vibrations or noise on deviation of roundness.

FIG. 6 illustrates roundness in the case where dynamic pressure generating points are provided at 120 degrees each to form a triangular shape as the largest isogonal and isotropic divisions. In this case, occurrence of vibrations can be suppressed as in the case described above.

With regard to the number of divisions, it has been revealed that the hexagonal shape contributes to suppression of occurrence of vibrations.

Figure 8:
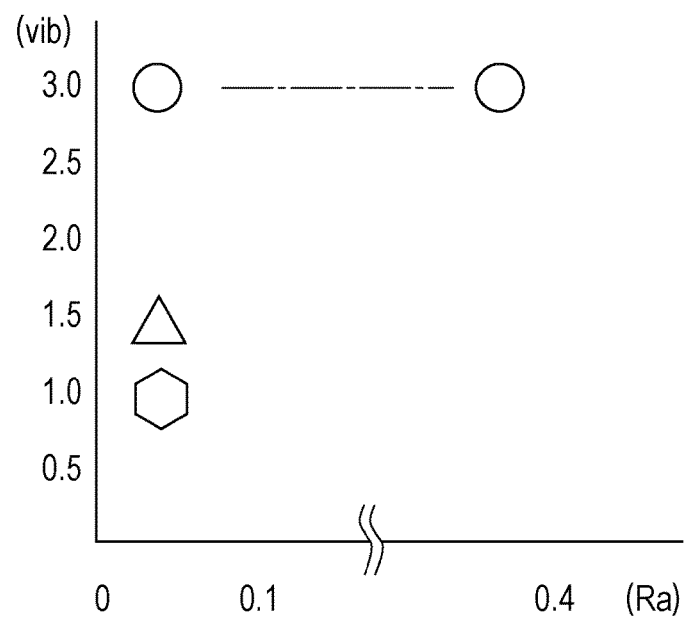
FIG. 8 is a graph of a Stribeck curve illustrating a lubricated state according to the present invention.
Figure 8:
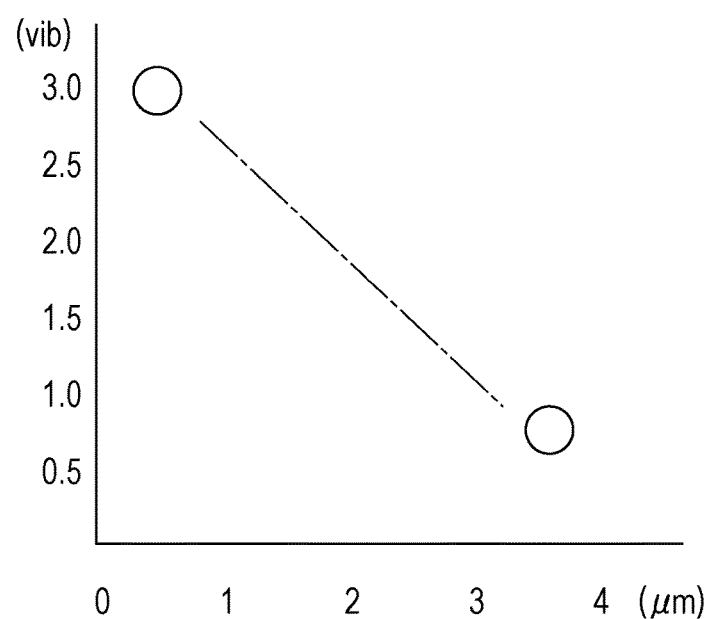

FIG. 8 is a schematic diagram illustrating a basic idea for vibration reduction. FIG. 8(a) illustrates the number of vibrations (G) in the vertical axis and arithmetic average roughness (Ra) in the horizontal axis. In the upper part of the graph, a circular mark shifts horizontally to indicate that improvement of surface roughness does not have influence on vibrations resulting in noise. The left-side surface roughness is Ra 0.06, and the right-side surface roughness is around Ra 0.4.

On the other hand, with regard to changes in the vertical axis on the left side of the graph, that is, increases or decreases in vibrations, it is understood that vibrations decrease as the circular shape with a high roundness changes to a more polygonal shape.

FIG. 8(b) illustrates a phenomenon that vibrations increase as the circular shape has higher roundness. The circular shape has a roundness of 0.8 μm or less on the upper left side, and has a roundness of 2.5 to 4 μm at the lower right side.

Figure 7:
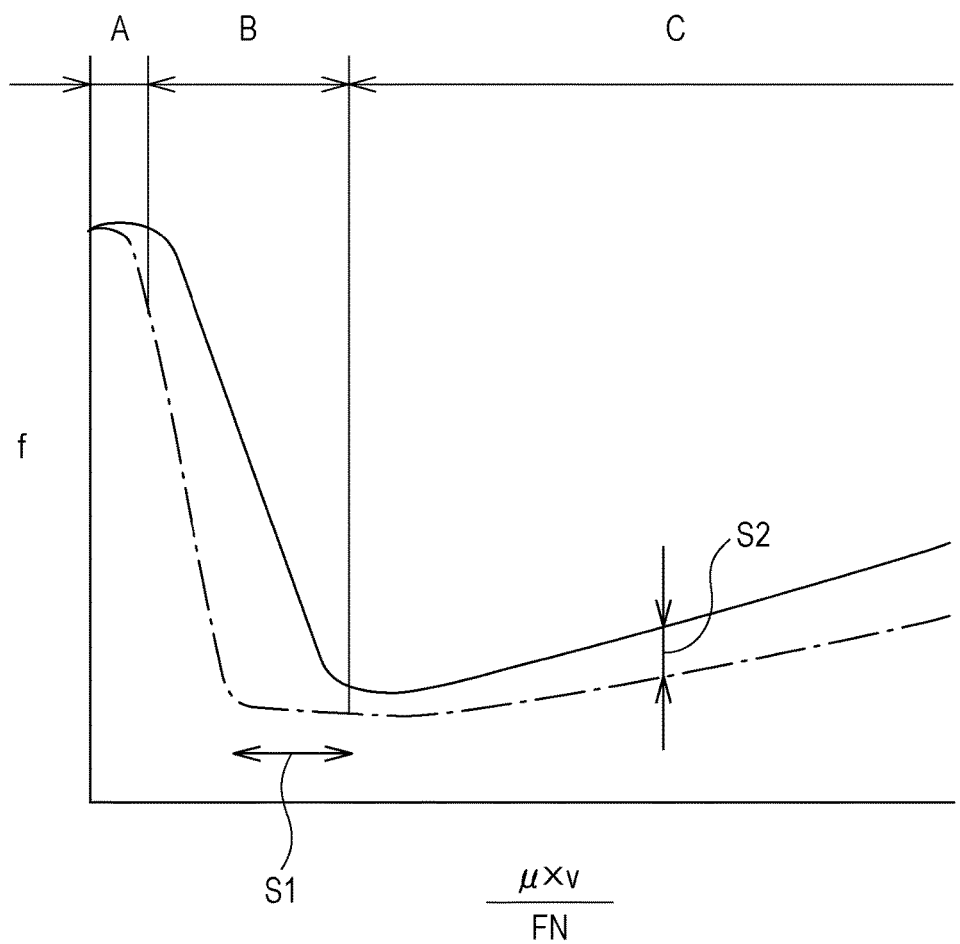
FIG. 7 is a schematic diagram illustrating a basic idea for vibration reduction.

In FIG. 7, a graph of a general Stribeck curve is used to describe the lubricated state of the low-vibration floating metal bearing 10 according to the present invention. The solid line drawn in the graph of FIG. 7 is a Stribeck curve generally used to describe the lubricated state between two relatively moving surfaces. The dashed-dotted line drawn in the graph illustrates the lubricated state of the low-vibration floating metal bearing 10 according to the present invention. This line is a virtual curve based on the experimental results.

The low-vibration floating metal bearing 10 according to the present invention makes it possible to reduce vibrations. Thus, it is considered that, by decreasing fluid friction due to vibrations, friction resistance can also be reduced by the decrease. Therefore, S2 indicates the presence of the decrease. It is also considered that, as an effect of the present invention described later, the centering property (self-centering function) can be produced. The dynamic pressure due to a working fluid associated with the rotation acts on the entire circular periphery of the bearing. Thus, it is considered that the shift from boundary lubrication region A at the stoppage to mixed lubrication region B and fluid lubrication region C takes place in a low rotational speed range. The presence of friction decrease at the initial stage of the rotation due to the centering effect is indicated as S1.

Figure 9:
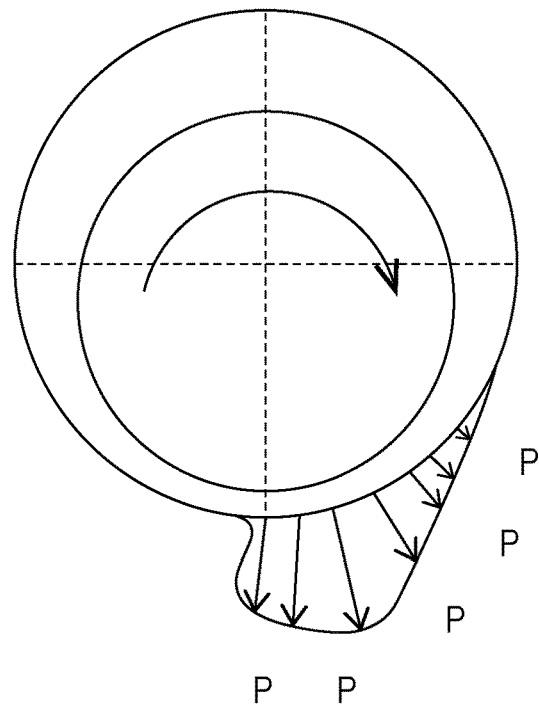
FIG. 9 is a diagram illustrating a centering function according to the present invention.
Figure 9:
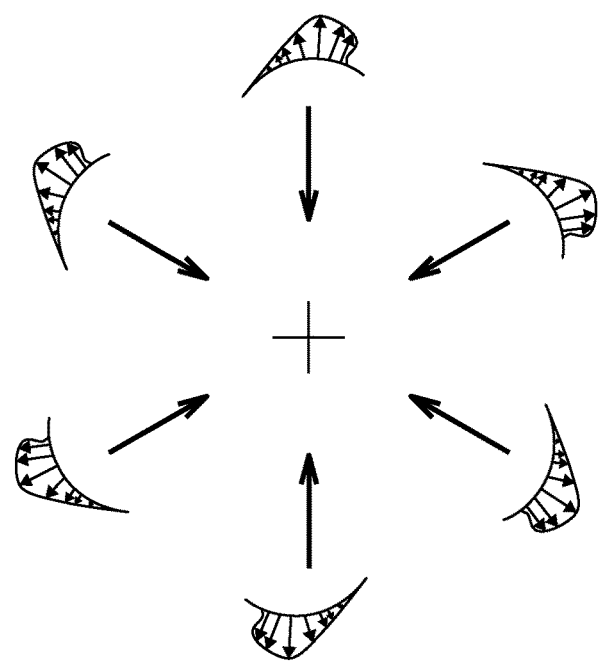

FIG. 9 is a diagram illustrating a centering property (self-centering function) as an advantage of the present invention. FIG. 9(a) illustrates distribution of pressure generated from Reynolds equation in wedge-shaped clearance. In FIG. 9(b), when the pressure distribution is placed at the circular periphery edge portion, the pressure generated from the rotation acts equally. This brings about an effect of uniformly suppressing vibrations by the pressure constantly acting toward the center. The effect is produced by the centering function associated with the advantage of the present invention.

The invention claimed is:

1. A low-vibration floating metal bearing comprising a slide bearing, the slide bearing comprising:
   oil supply holes formed at six isogonal positions in an isotropic manner with respect to an axial center; and
   a substantially circular bearing hole having a surface on which at least six regions with different fluid lubrication conditions are formed by inner machining so as to be continuously disposed at isogonal positions in the isotropic manner with isotropic distance with respect to an axial center, wherein
   each of the regions with different fluid lubrication conditions forms a narrow flow path that is substantially convex in cross section and extends in an axial center direction in an oil flow path by changing the amount of clearance between the surface of the substantially circular bearing hole and a surface of a substantially circular axis, and
   the narrow flow path causes a change in oil pressure to give a self-centering effect and suppress occurrence of noise from a low rotational speed range to a high rotational speed range.

2. The low-vibration floating metal bearing according to claim 1, wherein
   each of the regions with different fluid lubrication conditions is a region changing the amount of the clearance so as to moderately connect between the narrow flow path that is substantially convex in cross section and extends in an axial center direction and a wide flow path that is substantial concave in cross section and extends in an outer circumferential direction.

\* \* \* \* \*